(12) United States Patent
Stanley et al.

(10) Patent No.: US 8,896,326 B2
(45) Date of Patent: Nov. 25, 2014

(54) OCCUPANT DETECTION AND CLASSIFICATION SYSTEM

(75) Inventors: James Gregory Stanley, Novi, MI (US); Philip Maguire, Royal Oak, MI (US)

(73) Assignee: TK Holdings Inc., Auburn Hills, MI (US)

( * ) Notice: Subject to any disclaimer, the term of this patent is extended or adjusted under 35 U.S.C. 154(b) by 745 days.

(21) Appl. No.: 12/949,729

(22) Filed: Nov. 18, 2010

(65) Prior Publication Data

US 2011/0115500 A1 May 19, 2011

Related U.S. Application Data

(60) Provisional application No. 61/272,928, filed on Nov. 19, 2009.

(51) Int. Cl.
*G01R 27/26* (2006.01)
*B60N 2/00* (2006.01)
*B60R 21/015* (2006.01)

(52) U.S. Cl.
CPC .............. *B60N 2/002* (2013.01); *B60R 21/015* (2013.01); *B60R 2021/01512* (2013.01)
USPC ............ 324/661; 324/663; 324/688; 340/667

(58) Field of Classification Search
None
See application file for complete search history.

(56) References Cited

U.S. PATENT DOCUMENTS

| | | | |
|---|---|---|---|
| 5,446,391 A * | 8/1995 | Aoki et al. | 324/661 |
| 2006/0164254 A1 | 7/2006 | Kamizono et al. | |
| 2006/0187038 A1* | 8/2006 | Shieh et al. | 340/562 |
| 2007/0115121 A1 | 5/2007 | Schleeh | |
| 2007/0159178 A1 | 7/2007 | Stanley et al. | |
| 2008/0100425 A1* | 5/2008 | Kiribayashi | 340/425.5 |
| 2010/0039122 A1* | 2/2010 | McDonnell et al. | 324/662 |
| 2011/0115500 A1 | 5/2011 | Stanley et al. | |

FOREIGN PATENT DOCUMENTS

| | | |
|---|---|---|
| CN | 101007525 A | 8/2007 |
| EP | 2 085 263 A1 | 8/2009 |
| JP | 2009-248674 | 10/2009 |
| WO | WO-98/51547 | 11/1998 |

OTHER PUBLICATIONS

Written Opinion of the International Searching Authority & International Search Report in PCT/US2010/057255 dated Jul. 21, 2011.
International Search Report dated Dec. 23, 2013 issued in connection with International Application No. PCT/US2013/060891.
First Office Action dated Jan. 24, 2014 issued in connection with Chinese Application No. 201080052644.5, with English translation.

\* cited by examiner

*Primary Examiner* — Minh N Tang
(74) *Attorney, Agent, or Firm* — Foley & Lardner LLP

(57) ABSTRACT

An occupant detection system includes a controller, a sensing electrode, and a shield electrode, the electrodes disposed in a vehicle seat. The controller is electrically coupled to the sensing electrode and shield electrode by a sensing circuit. The controller is configured to send an input signal to the sensing electrode, the shield electrode, or both and measures current, impedance, or capacitance values to determine the presence of an object on the seat, to classify the object, or both.

9 Claims, 4 Drawing Sheets

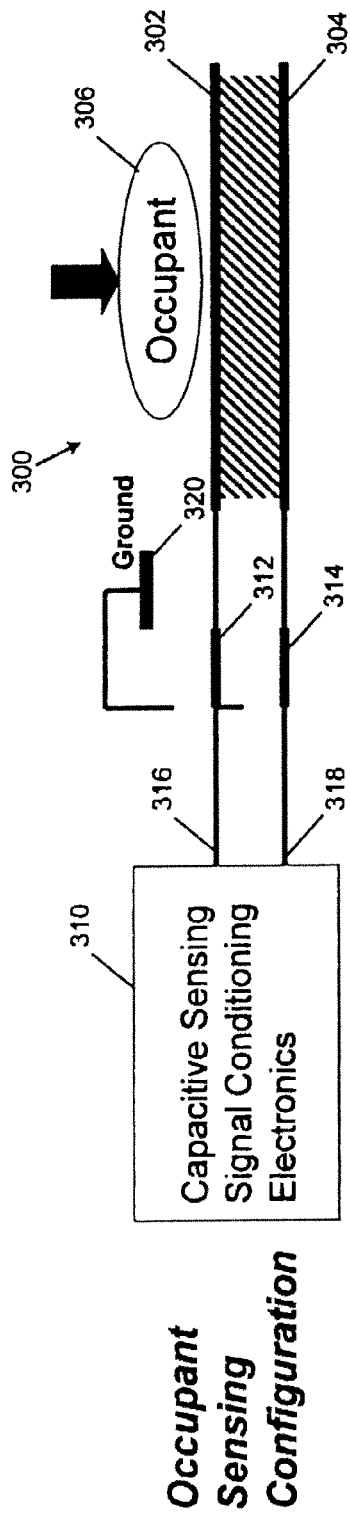
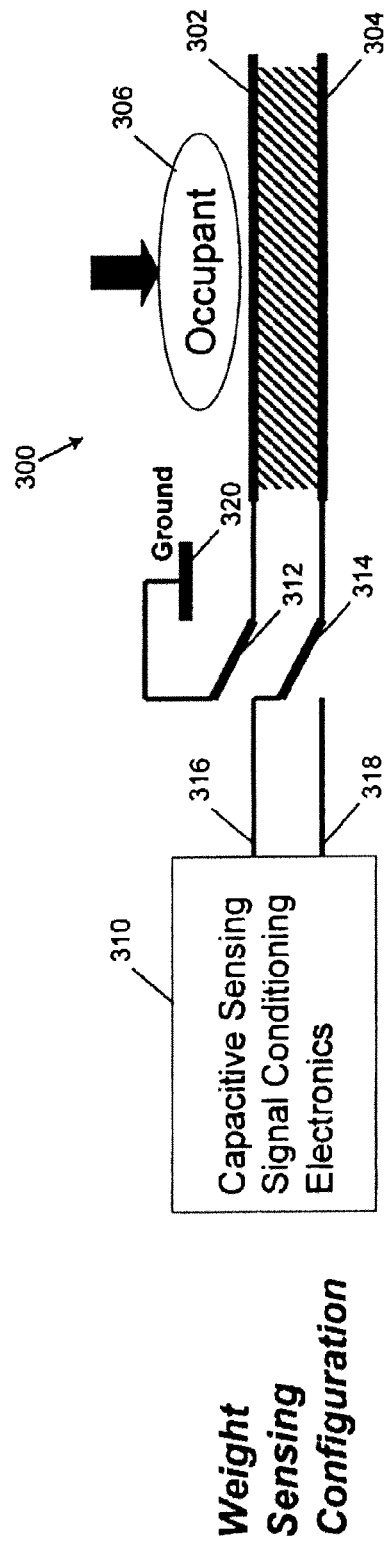

OCCUPANT DETECTION AND CLASSIFICATION SYSTEM

CROSS REFERENCE TO RELATED APPLICATIONS

The present application claims priority to and the benefit of U.S. Provisional Patent Application No. 61/272,928, filed Nov. 19, 2009. The foregoing provisional application is incorporated by reference herein.

BACKGROUND

The present disclosure relates generally to the field of capacitive sensing systems and sensing methods. More specifically, the disclosure relates to capacitive sensing systems and sensing methods for a vehicle seat.

There is a need for a system and method for accurate differentiation of an occupant from an object placed on a seat in an occupant classification system.

BRIEF DESCRIPTION OF THE DRAWINGS

These and other features, aspects, and advantages of the present invention will become apparent from the following description and the accompanying exemplary embodiments shown in the drawings, which are briefly described below.

FIGS. 3A and 3B are schematic diagrams of a capacitive sensing system, according to another exemplary embodiment.

DETAILED DESCRIPTION

Figure 1:
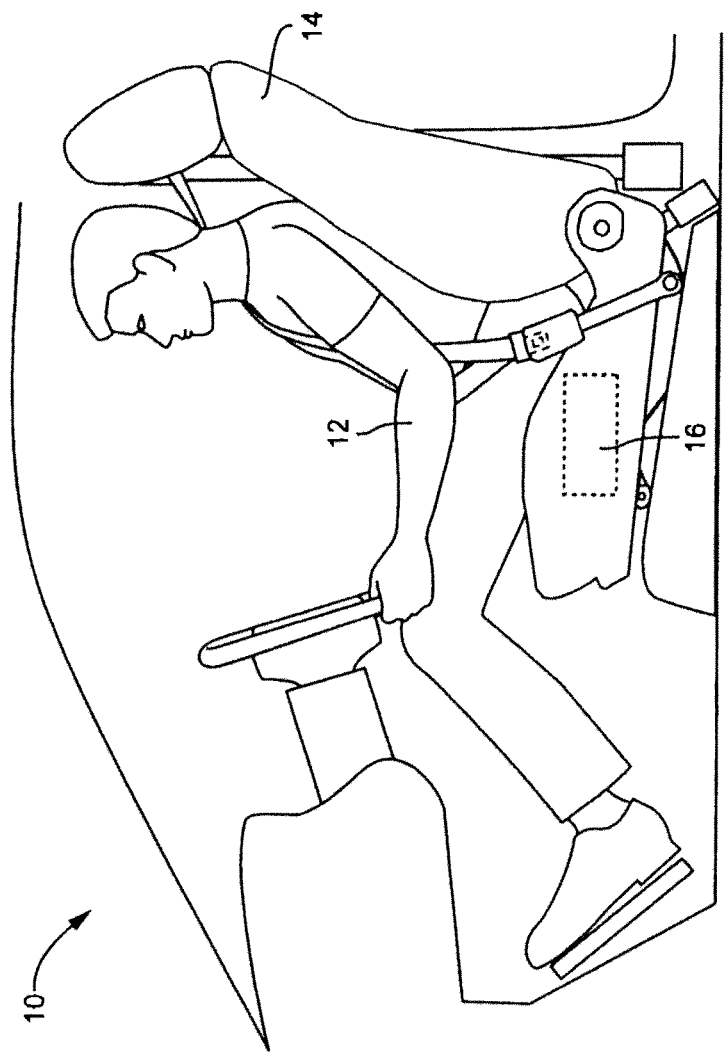
FIG. 1 is a schematic diagram of a vehicle seat, according to an exemplary embodiment.

The figures illustrate the exemplary embodiments in detail. However, it should be understood that the application is not limited to the details or methodology set forth in the description or illustrated in the figures. It should also be understood that the terminology is for the purpose of description only and should not be regarded as limiting.

A capacitive or electric field type sensor for use in an occupant classification system or occupant sensing system (for example, a system to detect occupancy of a vehicle seat) may be implemented in many ways. For example, according to one embodiment, an AC current may be provided to a sensing electrode located in a vehicle seat. The current or change in the current to the sensor may be measured and used as an indicator of the impedance from the sensing electrode to ground. In certain vehicle seat configurations, a seat heater may be provided. According to one embodiment of a occupant sensing system, an electrode may function as both a capacitive sensing electrode and a seat heater.

In an occupant classification system, the occupant is classified using information from sensors that sense characteristics about the object located on a vehicle seat. Some systems sense the total weight on the seat. When a capacitive sensor is used to classify the occupant, the environment above the seat cover is sensed using various techniques to identify the dielectric and conductive properties of the occupant. A conductive sensing element is placed in the seat and, according to one embodiment, the impedance from the electrode to ground may be used as an indicator of the occupant situation above the seat cover.

The occupant detection and classification system is configured so that the environment below the seating surface does not influence the classification of the occupant. When a seat heater is provided, typically a resistive heater is employed. A resistive heater is essentially a grounded wire or conductor located in the vehicle seat. The sensing electrode for an occupant classification and detection system may be placed above the seat heater. If the orientation between the sensing electrode and the heater changes, the offset capacitance will change and the change may result in a negative impact on the ability of the system to accurately classify the occupant. For example, the detection system may be configured to include an offset for the measurement of an empty seat conduction. If the empty seat offset of the measurement drifts significantly (e.g., due to a change in orientation of the electrode and heater), the system may not accurately classify the occupant.

According to various exemplary embodiments, a sensing system for automotive occupant classification may use various conductors in the seat as sensing electrodes. For example, the sensing system may include a "sensor" conductor or assembly located above a "shield" conductor. The shield conductor is configured to reduce sensitivity of the sensing system to or interference from objects below the shield (e.g., seat pan, seat heater, etc.). Due to the provision of a shield electrode, the occupant sensing system may be maintained in the same sensing configuration for sensing objects above the seat while the shield prevents the system from sensing of objects below the sensing electrode. A capacitive sensing occupant classification system may the measurements obtained from a sensing electrode to classify the occupant of a vehicle seat, and to determine whether to remind the occupant to buckle their seat belt.

According to other exemplary embodiments, a sensing system may use multiple electrodes on opposite sides of a thick piece of foam. Measurements may be made while the electrodes are in various configurations. According to still other exemplary embodiments, a sensing system may combine or integrate weight sensing concepts with capacitive sensing concepts into a single system. The integrated system may use weight/pressure information along with capacitive information to identify the occupant situation and produce a preferred classification.

According to various exemplary embodiments, a sensing system may use electronic methods for making capacitive measurements (e.g., using high frequency current measurements or other methods). The sensor assembly materials may include any type of conductive material for the electrodes (e.g., copper, conductive inks, conductive fabrics, etc.) and any compressible material for the spacer between the sensor and the shield (e.g., non-woven felts, woven materials, foams, materials used to allow air flow for forced air climate control seats, or any other material that will significantly compress at pressures under 1 psi).

Referring generally to the figures, an occupant classification system is described that uses a sensor (e.g., a capacitive vehicle sensor) to detect seat occupancy and to detect a weight on the seat. The occupant classification system may generally include a sensor and a shield. For occupant sensing, the sensor may be oriented above the shield to reduce the influence objects located under the shield (e.g., a seat heater) have on sensor measurements. The classification system may include a weight or force sensing capability. When sensing the weight, the sensor and shield may switch orientations (e.g., via electronic switching) with the sensor oriented below the shield to reduce the influence objects placed on top of the seat (e.g., electronic devices) have on sensor measurements. The occupant sensing and weight or force sensing measurements may be used together to determine whether an object on the seat is a person and may reduce the false detection of objects as people.

Referring to FIG. 1, a vehicle 10 is shown with an occupant 12 in a seat 14 of the vehicle 10, according to an exemplary embodiment. The seat 14 may include an occupant classification and detection system 16. As shown in FIG. 1, the occupant classification system 16 may generally be located in the seat 14 below the area in which an occupant 12 of the vehicle 10 sits, or may be located in other areas of the seat 14 or vehicle 10.

The occupant classification system 16 may generally include a sensor, a shield, and electronics for sensing and classifying the occupancy of the seat 14. For example, the sensor may be used to provide measurements that correspond to the effect of an object on the sensor due to both the conductivity and weight of the object. Measurements from the sensor may be evaluated to determine the existence of an object or occupant in the seat 14. The occupant classification system 16 may include or be configured to operate in conjunction with a seat heating system and/or other systems for the seat 14 of the vehicle 10.

The occupant classification system 16 includes a capacitive or electric field sensor that includes a sensing electrode. The capacitive sensor may generally be capable of sensing properties such as a proximity, position, or weight of an object, or the like. Various measurements from the sensing electrode may be used to detect the presence of an object in the seat. For example, the system may measure the a change in capacitance (e.g., changes in an electrical property between two conductive objects). As an occupant 12 sits on seat 14, the system may detect a capacitance change to determine the presence of the occupant 12 by the occupant classification system 16.

Figure 2A:
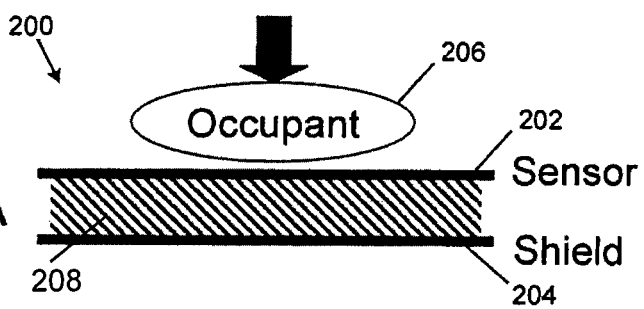
FIGS. 2A-2C are schematic diagrams of a capacitive sensing system, according to an exemplary embodiment.

According to one embodiment, as shown in FIG. 2A, a capacitive based occupant classification system 200 includes an upper electrode 202 and a lower planar electrode 204. In the embodiment of FIG. 2A, the upper planar electrode 202 is a sensing electrode 202 and the lower planar electrode 204 is a shield electrode. During a typical or normal measurement mode or configuration, the system 200 detects changes in the signal from the sensing electrode—the upper electrode 202 closest to an occupant 206—to determine whether an occupant is present. The shield electrode (the lower electrode 204) is located below the sensing electrode in a vehicle seat. The sensing electrode and the shield electrode may be changed to different configurations to measure the force on the surface of the seat.

Figure 2B:
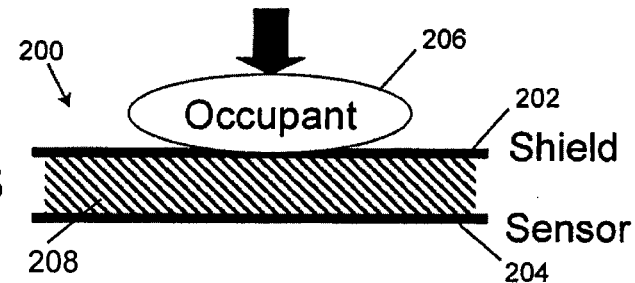

Referring to FIG. 2B, in one exemplary embodiment, the role or function of the sensing electrode and the shield electrode may be switched when the occupant classification and detection system is operated in a force or weight measurement mode. In the weight measurement mode, the system 200 may be configured to be less sensitive to the presence of the occupant and may be used to determine the weight of the occupant 206. During the weight measurement mode, capacitive or electric field sensing is performed using the measurements obtained from the lower electrode 204 furthest from the occupant (the shield electrode in the occupant sensing measurement) and the upper electrode 202 closest to the occupant 206 is switched to become the shield electrode. The electrodes 202, 204 may be switched using electronic or mechanical switches configured to modify the current flow through the electrodes. Instead of using the lower sensing electrode to measure the presence of the occupant, in the force or weight measurement mode, the system's electronics and/or software may be configured to measure the capacitance (or current or impedance) between the sensor and the shield (the electrodes 202, 204). The measured capacitance (or a measure representative or related to the capacitance or current or impedance) may be compared to a threshold value. A difference between the measured value and the threshold value can be attributed to a change in relative location of the sensors due to a force on the seat. The measurement may be made without being significantly influenced by the conductive or dielectric characteristics of the occupant 206 because the occupant 206 is shielded from the measurement by the upper electrode 202.

Figure 2C:
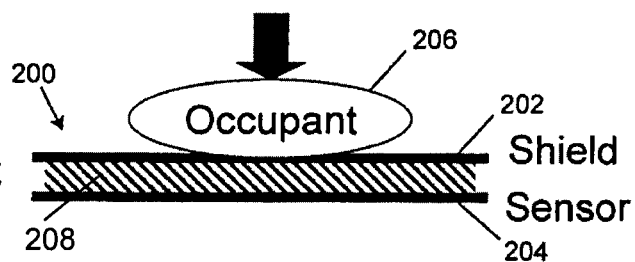

Referring to FIG. 2C, as the force on the seat bottom is increased, material 208 between the sensor (electrode 204) and the shield (electrode 202) is compressed. This compression causes the electrodes 202, 204 to move closer together causing a corresponding increase in the capacitance between the two electrodes 202, 204. The capacitance between the electrodes 202, 204 (or any other measure that is an indication of the change in relative position between the electrodes 202, 204) may be used to estimate the force on the seat applied by the occupant 206. The force on the seat may be used to differentiate between an occupant (i.e., person) and an inanimate object (e.g., computer).

FIGS. 3A and 3B disclose another exemplary embodiment of a capacitive or electric field type occupant classification and detection system. The system 300 shown in FIGS. 3A and 3B is similar to the system 200 of FIGS. 2A-2C and includes an upper electrode 302 and a lower electrode 304 for sensing an occupant 306. The system 300 further includes electronics 310 (e.g., sensing and signal conditioning electronics) configured to provide current or signals to drive the electrodes 302, 304 and to provide measurements on the electrodes 302, 304.

The occupant classification and detection systems disclosed herein may include a controller, processor or electronic control unit (ECU) that controls the system and receives various measurements from the system components (e.g., the sensing electrodes). The controller is configured to interact with other vehicle systems such as, for example, vehicle safety systems (e.g., airbag and seat belt systems). The controller may provide a signal to a vehicle safety system that indicates whether an adult person is located in the vehicle seat so that safety devices may be activated if appropriate. The controller for the occupant classification system may be integrated with a controller for another vehicle system such as, for example, the controller used for a vehicle safety system.

Referring specifically to FIG. 3A, the system 300 includes an occupant sensing mode or configuration for detecting the occupant 306 while shielding interference from below the system 300, according to one exemplary embodiment. System 300 includes a switch 312 that electrically couples the upper electrode 302 to a sensing port 316 of the electronics 310 and includes a switch 314 that electrically couples the lower electrode 304 to a shield port 318 of the electronics 310. In the configuration of FIG. 3A, the upper electrode 302 is the sensing electrode and the lower electrode 304 is the shield electrode.

Referring now to FIG. 3B, the system 300 also includes a weight or force sensing mode or configuration that reduces sensitivity to electrical properties of the occupant 306 and may be used for determining the weight of the occupant 306, according to one exemplary embodiment. In the embodiment of FIG. 3B, the conductor or upper electrode 302 near the occupant 306 is switched to ground 320 and the conductor or lower electrode 308 away from the occupant 306 is switched to the sensing port 316 of the electronics 310. In the configuration of FIG. 3B, the upper electrode 302 is the shield electrode and the lower electrode 304 is the sensing electrode.

The electronics 310 employed by the system may be software and any analog or digital circuitry capable of controlling the occupant classification system 300. Also, according to various exemplary embodiments, the switches 312, 314 may be any electronic or mechanically actuated switches capable of modifying a flow of electrical current. The electronics 310 may be configured to control the switching of the switches 312, 314. For example, the system 300 may generally be in an occupant sensing configuration and only switch to a weight sensing configuration for verification if the sensing configuration determined the occupant to be of adult size. Alternatively, the switching may occur periodically at a time interval.

The addition of a weight or force measurement to the electric field or capacitive measurement allows the system to separate or discriminate between cases where an object may look large (e.g. appear like an adult) to the capacitive sensing system 200, 300, but is physically small. For example, capacitive loading or electrical interference generated by electronic devices on the seat, especially when those devices are plugged into the 12 volt accessory plug in the vehicle, may cause an increase in measured capacitance when the sensing node is positioned above the shield node. Such electronic devices may include cellular phones, smart phones, personal digital assistants (PDAs), global positioning systems (GPS), optical disc (e.g., DVD, Blu-Ray, etc.) players, laptop computers, or any other electronic device. Electronic devices may appear large to the capacitive sensor because they are conductors and are well coupled to ground. Recognizing electronic devices or other objects on the seat incorrectly as adults may cause an annoyance when the vehicle seat belt reminder turns on. The exemplary embodiments described above solve the annoyance issue by integrating a low cost force measurement into a capacitive sensing system. The weight sensing configuration may also be used to identify the empty seat and diagnose problems with the capacitive sensing system and the same measurement electronics and connections out to the sensor may be used for the weight measurement and the capacitive measurement, resulting in a low cost solution.

The exemplary embodiments of FIGS. 2 and 3 may use any configuration of electrodes where the change in relative physical location of the sensor to shield is measured electronically and is not influenced significantly by the conductive or dielectric characteristics of the occupant. According to alternative exemplary embodiments, instead of detecting the capacitance between the sensor and shield electrodes, the system may use multiple measurements in multiple configurations to calculate a high frequency (e.g., about 100 kHz, greater than 100 kHz, etc.) AC current flowing only between the sensor and shield. A significant increase in that measured current indicates an increase in the sensor to shield capacitance, which indicates a change in relative position of the sensor and shield due to an increased force from the occupant. According to other examples, the capacitance between the sensor and shield electrodes may be measured by analyzing a change in an RC time constant, a change in a response of the system to a step voltage to the electrodes, a change in charge sharing between the electrodes, or any other method of measuring capacitance.

Figure 4:
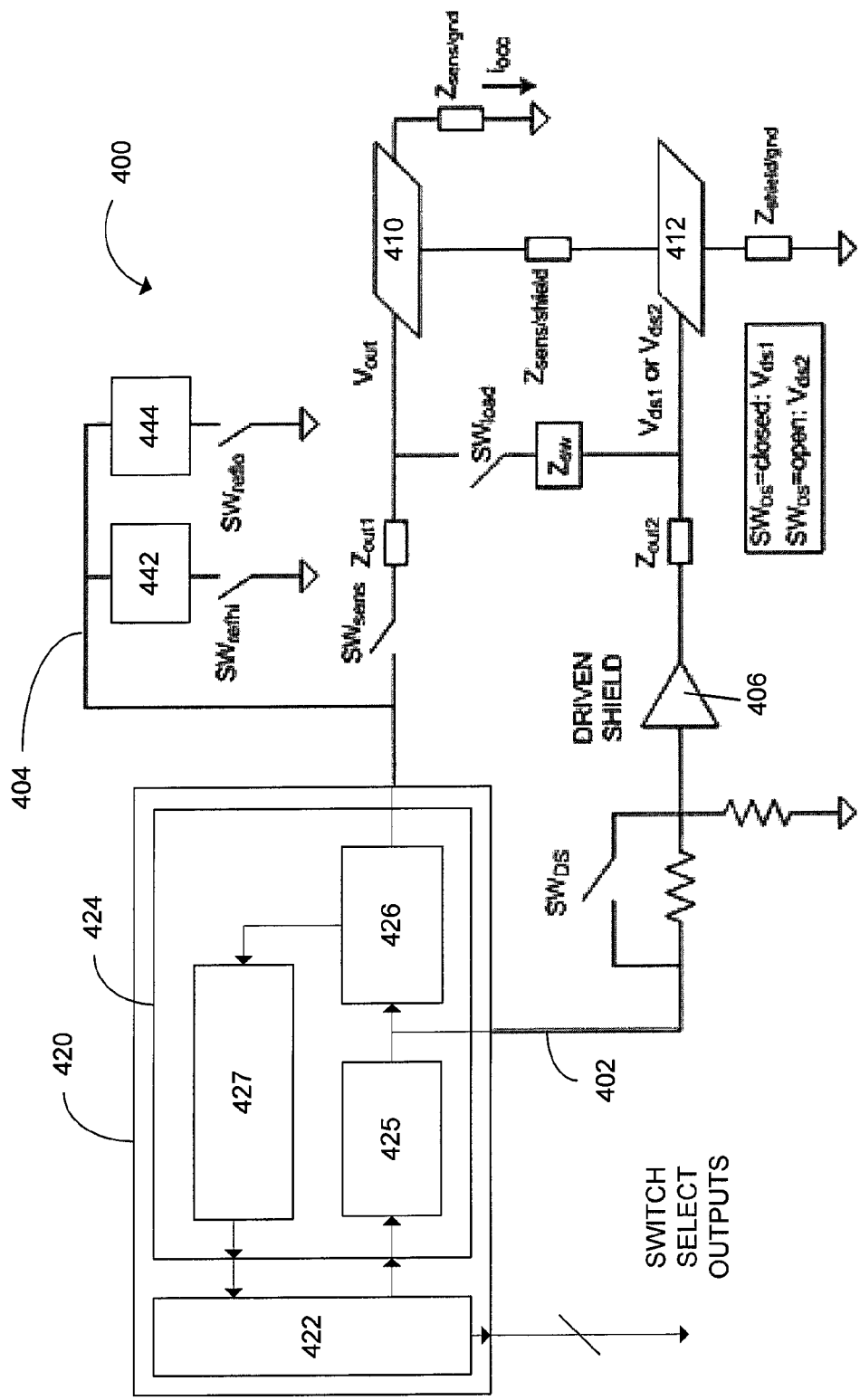
FIG. 4 is a circuit diagram of the occupant detection system according to one exemplary embodiment.

FIG. 4 depicts a representative or exemplary circuit diagram of an occupant detection system 400 according to one exemplary embodiment. The occupant detection system 400 includes a sensing circuit 402 electrically connecting the sensing electrode 410, the shield electrode 412, switches $SW_{DS}$ and $SW_{load}$, and electronics 420. The sensing circuit 402 may also include a signal producing device 406, such as an amplifier or transistor, disposed between electronics 420 and the shield electrode 412. The sensing electrode 410 may also include a conductor, sensing node, or other device, such as an inductor, disposed outside the electronics 420. The shield electrode 412 may also include a conductor or other device, such as a shield node, disposed between the shield electrode 412 and signal producing device 406. While the sensing circuit 402 is shown outside the electronics 420, the electronics 420 may include components of the sensing circuit 402, such as switches, amplifiers, or other devices. For example, the electronics 420 and components of the sensing circuit 402 may be integral, disposed in a common housing, or on a common circuit board, while the sensing and shield electrodes 410, 412 are external to the housing and electrically coupled to the electronics 420. Those skilled in the art, however, will recognize that other configurations are possible according to other embodiments.

The electronics 420 generally include a controller 422 and a signal conditioning device 424. The signal conditioning device 424 generally includes a sine wave output device 425, a current sense circuitry 426, and a demodulation and filtering device 427. The signal conditioning device 424 produces an output signal, measures current, and produces an input signal corresponding to the measured current.

The controller 422 may be a microprocessor or electronic control unit (ECU) and controls the occupant detection system 400. The controller 422 determines when the signal conditioning device 424 produces an output signal, opens and closes the switches $SW_{DS}$ and $SW_{load}$, and interprets the input signal received from signal conditioning device As described further below, the system 400 may be operated to obtain certain measurements that may be used to obtain a representative indication of the force on the vehicle seat, such as when the occupant's weight forces the sensing electrode 410 toward the shield electrode 412. The electronics 420 are used to calculate the impedance between the sensing electrode 410 and shield electrode 412, which can be used to classify the occupant. The electronics 420 may also be used to calculate the impedance between the sensing electrode 410 and ground, which can be used to detect an occupant. The electronics 420 may also be used to calculate the impedances between the sensing electrode 410 and both the shield electrode 412 and ground to both detect and classify an occupant.

The controller 422 may be a microprocessor or electronic control unit (ECU) and controls the occupant detection system 400. The controller 422 determines when the signal conditioning device 424 produces an output signal, opens and closes the switches $SW_{DS}$ and $SW_{load}$, and interprets the input signal received from signal conditioning device 424.

By opening and closing the switches $SW_{DS}$ and $SW_{load}$, the sensing circuit 402 of the occupant detection system 400 may be placed in four different configurations (i.e., switches $SW_{DS}$ and $SW_{load}$, respectively, are closed/open, closed/closed, open/open, and open/closed). Closing $SW_{DS}$ changes the amplitude of the output signal on the shield electrode 412, and closing $SW_{load}$ introduces an impedance $Z_{SW}$ between the sensor and shield electrodes 410, 412.

In each of the four circuit configurations, current is measured by the signal conditioning device 424, thus providing four current measurements $M_1$, $M_2$, $M_3$, and $M_4$. $M_1$ is measured when $SW_{DS}$ is closed and SW load is open, $M_2$ is measured when $SW_{DS}$ is closed and $SW_{load}$ is closed, $M_3$ is measured when $SW_{DS}$ is open and $SW_{load}$ is open, and $M_4$ is measured when $SW_{DS}$ is open and $SW_{load}$ is closed.

From these four current measurements, a number proportional to the impedance between the sensing electrode 410 and shield electrode 412 (i.e., a force value) is calculated by the controller 422 as follows:

$$\frac{-Z_{sensor/shield}}{Z_{SW}} = \left(\frac{M_4 - M_2 - M_3 + M_1}{M_1 - M_3}\right)$$

This equation is derived from the following equations:

$$M_1 = \left(\frac{V_{out} - V_{ds1}}{Z_{sensor/shield}} + \frac{V_{out}}{Z_{sensor/ground}}\right)$$

$$M_2 = \left(\frac{V_{out} - V_{ds1}}{Z_{sensor/shield}} + \frac{V_{out}}{Z_{sensor/ground}} + \frac{V_{out} - V_{ds1}}{Z_{SW}}\right)$$

$$M_3 = \left(\frac{V_{out} - V_{ds2}}{Z_{sensor/shield}} + \frac{V_{out}}{Z_{sensor/ground}}\right)$$

$$M_4 = \left(\frac{V_{out} - V_{ds2}}{Z_{sensor/shield}} + \frac{V_{out}}{Z_{sensor/ground}} + \frac{V_{out} - V_{ds2}}{Z_{SW}}\right)$$

The number $$\frac{-Z_{sensor/shield}}{Z_{SW}},$$

thus, is proportional to the impedance between the sensing electrode 410 and the shield electrode 412 and may be used to determine the relative force on the vehicle seat in order to classify the occupant. The resulting occupant classification may be used, for example, to determine whether the seatbelt reminder should be turned on or whether an airbag should deploy.

From current measurements $M_1$, $M_2$, $M_3$, and $M_4$, a number corresponding to the impedance between the sensing electrode 410 and ground (i.e., a detection value) may also be calculated as follows:

$$i_{occ} = \frac{(M_1 \times M_4) - (M_2 \times M_3)}{M_1 + M_4 - M_2 - M_3}$$

This equation is derived from the following equations:

$$M_1 = i_{occ} + \left(\frac{1 - V_{ds1}}{Z_{sensor/shield}}\right)$$

$$M_2 = i_{occ} + \left(\frac{1 - V_{ds1}}{Z_{sensor/shield}}\right) + \left(\frac{1 - V_{ds1}}{Z_{SW}}\right)$$

$$M_3 = i_{occ} + \left(\frac{1 - V_{ds2}}{Z_{sensor/shield}}\right)$$

$$M_4 = i_{occ} + \left(\frac{1 - V_{ds12}}{Z_{sensor/shield}}\right) + \left(\frac{1 - V_{ds2}}{Z_{SW}}\right)$$

where $Z_{SW}$ is cancelled out and need not be known, but should be large enough to meaningfully change the calculations, and $Z_{sensor/shield}$ is derived from the equation for $$\frac{-Z_{sensor/shield}}{Z_{SW}}$$

above. The value for $i_{occ}$ corresponds to (i.e., is inversely proportional to) the impedance between the sensing electrode 410 and ground and may be used to determine the presence of the occupant or an object (i.e., detect an occupant).

According to one exemplary embodiment, the occupant detection system may also include a normalization circuit 404. The normalization circuit 404 enables the electronics 420 to adjust for measurement variations due changes in gain, offset shift and phase shift in the sensing circuit 402.

The normalization circuit 404 includes a high reference impedance device 442 and a low reference impedance device 444, each having a different, known impedance. Corresponding switches $SW_{refhi}$ and $SW_{reflo}$ selectively connect the high and low reference impedance devices 442, 444, respectively, to ground. The signal conditioning device 424 produces a 100 kHz, as an example, AC current at constant voltage and measures reference currents $M_{refhi}$ and $M_{reflo}$. Reference current $M_{refhi}$ is measured when $SW_{refhi}$ is closed and $SW_{reflo}$ is open, and reference current $M_{reflo}$ is measured when $SW_{refhi}$ is open and $SW_{reflo}$ is closed.

The sensing circuit 402 is provided with a switch $SW_{sens}$ to isolate the sensing circuit 402 and normalization circuit 404. When current measurements $M_1$, $M_2$, $M_3$, and $M_4$ are taken, $SW_{sens}$ is closed. When reference currents $M_{refhi}$ and $M_{reflo}$ are taken, $SW_{sens}$ is open, thus isolating the normalization circuit 404 from the sensing circuit 402.

By measuring reference currents $M_{refhi}$ and $M_{reflo}$ with respect to impedance devices 442, 444 of known impedance and isolating the normalization circuit 404 from the sensing circuit 402, the microprocessor 422 may calculate system impedance independent of the sensing circuit 402. In this manner, the microprocessor 422 may account for changes in gain, offset shift and phase shift in the sensing circuit 402 more accurately detect and classify the occupant.

According to various exemplary embodiments, the shield may be driven with any potential or signal that is compatible with the measurement concepts and the associated electronics hardware. For example, the shield may be driven with a signal that is similar to or the same as the sensor signal, may be connected to a fixed DC level, or may be driven with various signals to enable the multiple measurement concept mentioned above.

Although the occupant classification system 200, 300 is illustrated as including multiple features utilized in conjunction with one another, the system 200, 300 may alternatively utilize more or less than all of the noted mechanisms or features. For example, in other exemplary embodiments, the more electrodes may be used in the system 200, 300.

Although specific shapes of each element have been set forth in the drawings, each element may be of any other shape that facilitates the function to be performed by that element. For example, the electrodes have been shown to be planar electrodes, however, in other exemplary embodiments the structure may define electrodes of other shapes. Further, while a specific form of switches has been shown in FIG. 3, according to other exemplary embodiments, the switches may be in other forms or actuate in different directions. The sensing and classification system described in detail above, may be employed with existing occupant detection systems such as those described in U.S. patent application Ser. No. 12/541,825. The foregoing patent application is incorporated by reference herein in its entirety.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature The present disclosure has been described with reference to example embodiments, however persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A system for detecting an occupant in a vehicle comprising:
   a sensing electrode mountable in a seat bottom of a vehicle seat;
   a shield electrode located in the vehicle seat below the sensing electrode;
   a sensing circuit operatively coupled to the sensing electrode and the shield electrode;
   a controller operatively coupled to the sensing circuit,
   wherein the controller operates to configure the sensing circuit into four circuit configurations; and wherein in each of the four circuit configurations the sensing electrode and the shield electrode are electrically coupled to the sensing circuit, wherein the controller sends a signal to the sensing circuit, and measures a plurality of current measurements, each current measurement corresponding to one of the four circuit configurations,
   wherein the plurality of current measurements are used by the controller to determine the presence of an object on the vehicle seat and to classify the object; and
   wherein the sensing circuit comprises:
      a first switch configured to change an amplitude of the signal between a first amplitude and a second amplitude, the first amplitude and the second amplitude being greater than zero, and
      a second switch configured introduce a known impedance in the sensing circuit,
      wherein the first switch and second switch are opened and closed by the controller to configure the sensing circuit into the four circuit configurations.

2. The system of claim 1, wherein the controller calculates a detection value relating to impedance between the sensing electrode and ground based on the plurality of current measurements to determine the presence of the object, and calculates a force value relating to impedance between the sensing electrode and the shield electrode based on the plurality of current measurements to classify the object.

3. The system of claim 1, wherein the controller determines whether to activate a seat belt indicator or an air bag.

4. The system of claim 1, wherein a compressible material is disposed between the sensing electrode and the shield electrode.

5. The system of claim 1, wherein the controller is configured to detect a change in the plurality of current measurements due to an electric-field influencing property of the object on the vehicle seat.

6. The system of claim 5, wherein the controller is configured to detect a change in the plurality of current measurements resulting from a change in the relative position of the sensing electrode to the shield electrode due to the weight of the object located on the vehicle seat.

7. The system of claim 1, wherein
   the controller calculates a detection value related to an impedance from the sensing electrode to a ground using the plurality of current measurements.

8. The system of claim 7, wherein the controller calculates a force value related to an impedance between the sensing electrode and the shield electrode using the plurality of current measurements.

9. The system of claim 1, wherein the sensing electrode and the shield electrode are not configured to be decoupled from the sensing circuit.

* * * * *